Patented June 29, 1954

2,682,560

UNITED STATES PATENT OFFICE 2,682,560

CONVERSION OF ORGANIC HYDROXY COMPOUNDS TO CARBONYL DERIVATIVES

Edward H. Carter and Louis E. Sartain, Kingsport, Tenn., assignors to Eastman Kodak Company, Rochester, N. Y., a corporation of New Jersey No Drawing. Application November 22, 1952, Serial No. 322,152

7 Claims. (Cl. 260—603)

This invention relates to the conversion of organic hydroxy compounds to carbonyl derivatives. More particularly, this invention is concerned with an improved copper-silver compacted screen type catalyst particularly useful in processes for the conversion of ethyl alcohol to acetaldehyde.

This application is a continuation in part of our application Serial No. 111,568, filed August 20, 1949, now abandoned, which in turn is a continuation in part of our application Serial No. 748,843, now Patent Number 2,482,742.

As shown by various publications, such, for example, as Industrial Catalysis by Green (1928), pages 386 and 387, in the past copper and silver-containing catalysts have been used industrially in dehydrogenation reactions, such as in the conversion of methyl alcohol to formaldehyde. As shown in the Catalytic Oxidation of Organic Compounds in the Vapor Phase by Marek and Hahn (1932), pages 44 and 45, the catalytic activity of such catalysts diminishes after a certain period and heretofore restoration of activity has been accomplished by oxidation of the catalyst with hot air. In the industrial use of this type of catalyst it has been customary to obtain a relatively pure metal such as substantially pure copper or silver and fabricate the catalyst from these materials. The catalyst has heretofore been fabricated into various forms and sizes, including pellets and screens.

In the prior use of a catalyst, such, for example, as a copper or silver screen catalyst fabricated from a good grade of metals, it has been observed that, in some instances, the new catalyst, when inserted in the catalytic converter, might start to function very easily, whereas in other instances it required much longer periods of ancillary heating before the catalyst attained sufficient temperature to function self-sufficiently. Also in the operation of such prior art catalysts, while at the onset of the process the catalyst gave good conversion, after a period of operation, which might not be constant or uniform for each catalyst, a decrease of efficiency was indicated, this being evidenced by reduction in the amount of conversion per pass and/or by an increase in the decomposition products in the effluent materials. In other words, considering specifically the treatment of ethyl alcohol in contact with a catalyst, in prior art operation, using the usual untreated copper and/or silver catalyst, in some instances the percentage of acetaldehyde in the effluents dropped 10% or 15% after the catalyst had been used for a relatively short period. Also, in some instances decomposition increased after extended usage, as indicated by an increase in the carbon monoxide and carbon dioxide contents of the effluent gases from less than one per cent up to several per cent.

Furthermore, in the processing of hydroxy compounds, such as the conversion of ethyl alcohol to acetaldehyde and involving contact of these materials with copper and/or silver catalyst, it has been observed that both the conversion and the amount of decomposition resulting from the use of a catalyst derived from a given source are likely to differ from the conversion and decomposition obtained with a similar catalyst derived from a different source. Likewise, while one catalyst might operate for several months, in the instance of another catalyst, presumably from similar materials and constructed in the same physical form, the amount of decomposition products in the effluents might increase to such a value that the efficiency of the process would be impaired in that too great a portion of the feed materials would be decomposed to carbon monoxide and carbon dioxide.

We have found, in accordance with the invention described in detail herein, that an improved type of catalyst may be prepared which is highly advantageous in that the catalyst is more uniform and the results obtained therefrom more consistent. Also our catalyst, newly charged into a converter, permits relatively fast starting of the converter and operation over longer periods of time than heretofore and without the quantity of decomposition products increasing to an undesired value. We have found that our process of preparing and assembling the improved catalyst described herein may be applied, not only to new catalyst material, but also that old, or used, catalyst material treated in a comparable manner may be restored to activity and uniformity repeatedly with results which are comparable to those obtained with new catalyst material which has initially been treated in accordance with the present invention.

This invention accordingly has for one object to provide an improved catalyst material particularly suitable for use in converting organic hydroxy compounds to carbonyl compounds. A further object is to provide an improved copper and/or silver catalyst which is easier to use than similar known catalysts when initiating a reaction, gives more uniform and duplicable operation, and has extremely long life. A still further object is to provide an improved copper and/or silver compressed-screen type of catalyst. Another object is to provide a method of rendering more uniform and efficient a metallic screen type catalyst, which has been used. Still another object is to provide a method of treating catalyst screens wherein the metal comprising the screens may have been obtained from various sources or is of various conditions of purity, to obtain catalytic material that is relatively uniform as indicated by duplicable results when the catalyst materials are used in parallel converters. A further object is to provide an improved and relatively uniform process for converting lower aliphatic alcohols to their corresponding carbonyl derivatives. A specific object of the invention is to provide an improved process for converting ethyl alcohol to acetaldehyde. Other objects will appear hereinafter.

These objects are accomplished by the following invention which is based upon the discovery that by treating either a new catalyst or used catalyst screen by an annealing process described in detail herein that the catalyst screens may be greatly improved, as evidenced by more uniform results and less decomposition products in the effluents in process of using said catalyst screens, even after much longer periods of catalyst utilization than heretofore employed in the prior art. It will be observed that our method of heat treatment is considerably different than the methods referred to above of treating catalytic material with blasts of hot air or other oxidizing media. It is also different than the treatment of catalytic screens with a blowtorch and the like in that such prior treatments with heating may give catalyst screens of nonuniform activity. That is, catalyst screens treated with blowtorches and welding torches may tend to develop hot spots on the surfaces, which spots may be overactive at some points, thereby causing greater losses, probably through decomposition of feed material to carbon monoxide and carbon dioxide at the hot spots in subsequent use of the screens so treated, as well as otherwise contributing to uneven temperature conditions over the surface of the catalyst.

We have found that catalytic material of the class described, either new or used catalyst screens, for example, may be materially improved by a system of heating or annealing said catalyst screens over a period of preferably more than three hours and usually not longer than fifteen hours and for a temperature and period which is insufficient to soften the catalyst. Usually a temperature of from about 700° F. to not greater than about 1500° F. is satisfactory, namely, a temperature which, depending upon the length of the heating, would not be high enough to unduly soften the catalyst. We have found it preferable to employ several alternate layers of catalyst screens, as described in detail hereafter and, after the catalyst screens have been properly heated in accordance with the present invention, they are preferably compacted somewhat by pressure so that the height of the alternate layers of screens is reduced by this compacting by, say, 2% to 10%. That is, if the height of the alternate catalyst screens were initially about 4 inches it would be compacted by sufficient pressure to reduce the height a fraction of an inch, or, for example, to around 3½ inches. We have further found that catalyst screens of the type described, even after they have been used a year or more, may, in accordance with the present invention, be retreated one or more times and thus restored to a condition comparable to their initial condition.

Our invention is set forth in further detail by reference to the following description of the treatment of an alternate copper and silver screen type catalyst.

A relatively good grade of copper and silver screening made up of about .06–.07″ diameter wire of between 6 to 10 mesh was obtained from commercial channels. This wire was cut into a configuration corresponding to the internal configuration of the catalytic converter into which the material was to be inserted. However, before placing the screens in the converter they were given a treatment, in accordance with the present invention, as follows:

The copper screens were placed in an iron rack and likewise the silver screens were placed in another similar iron rack. The iron racks containing the screening were inserted into a cold annealing furnace so that the racks containing the catalyst screens were positioned about two feet above the bottom of the furnace. The furnace employed for the treatment was similar to the usual metallic annealing furnace and was made up of ceramic firebrick which enclosed the furnace space. The furnace was heated from the bottom by a series of burners using kerosene or other light oil as a fuel. Each burner was provided with an inlet for sufficient air (some excess) for the complete burning of the kerosene or other fuel. The bottom of the aforementioned furnace was provided with uniformly-spaced inlet ports from the burner chamber so that the combustion products passed into the interior of the furnace and around the catalyst screens contained in the racks aforementioned. The upper portion of the furnace was provided with conventional outlet ports which discharged to a stack or otherwise to the atmosphere for permitting the products of combustion to escape from the interior of the furnace.

After placing the screens in the furnace, combustion was initiated so that the inside temperature of the furnace immediately above the screens, as determined by thermocouples positioned immediately above the screens, was rapidly raised to 1,000° F. The temperature was controlled at this value, by control of the supply of fuel and oxidizing gas, for approximately seven hours. The furnace was then allowed to cool to atmospheric temperature and the screens removed. The surface of the screens was slightly oxidized and a fluffy coating of material which analyzed principally iron oxide was dusted off with a compressed air hose.

The catalyst screens thus treated were assembled in a stack comprising first several layers of silver screening, then in alternate layers, one or two layers of the copper or silver screen, until the alternate layers were stacked several inches high. This stack of catalyst was then compressed so that its initial height was reduced by approximately 2% to 6%. The compressed alternate layers of catalyst screening were then placed in the usual converter. If desired, the compressing may be accomplished in the converter.

The improved results obtained by using catalyst material so treated in accordance with the present invention will be apparent from consideration of the following examples.

*Example I*

In this example a comparison is made of the greater ease in starting up a catalyst unit containing the processed copper-silver screen of the present invention as compared with the starting time required when using an unprocessed copper-silver screen.

The catalyst unit was filled with the compressed, annealed alternate copper-silver screen catalyst, as described above, of the present invention. The particular catalyst unit used in this example contained over twenty-five alternate layers and in its compressed condition was slightly over 3" in thickness. The unit was to be operated for converting ethyl alcohol to acetaldehyde. In order to place the unit in operation it is necessary to heat the unit up to about 932° F. or such temperature as may be necessary to start operations when the alcohol and air are fed in. This auxiliary heating for starting the apparatus was accomplished by supplying the combustion products from burning producer gas to heat the catalyst screens up to sufficient temperature for initiating reaction. After a thermocouple showed a temperature from 662° F. to 842° F. within the catalyst until a mixture of commercial ethyl alcohol and air, preheated and in a vaporous condition, was introduced into the unit below the catalyst screens. Upon contacting the catalyst that had been initially warmed by auxiliary heating, conversion of the alcohol to acetaldehyde took place. In less than one hour the unit was operating in a self-sufficient manner, the catalyst being kept up to temperature by the exothermic heat of the reaction, all auxiliary heating being cut off. Also within the hour the feed of the alcohol was increased to normal production amounts and the conversion per pass of the alcohol to acetaldehyde at the end of the hour exceeded 50%. In starting the same unit in prior instances with catalyst unprocessed in accordance with the present invention several hours were required to get the unit into operation before desired conversion was attained and the auxiliary heating could be cut off.

*Example II*

In accordance with this example a comparison was made of a unit containing the prior art type of screen with the same unit containing the present improved type of screen. The unit with the prior art type of screen operated over a period slightly greater than six months before the decomposition products, as evidenced by carbon monoxide and carbon dioxide in the effluents, exceeded a predetermined standard or 3%. In other words, when the content of the effluent gas contains more than 3% carbon monoxide and carbon dioxide, this indicated that too great a portion of the feed was being lost through decomposition and that catalyst failure, from the economic standpoint, had occurred. The unit was shut down and the catalyst screen replaced with an improved screen of the present invention. The unit was started up as described in Example I, the same type of feed and other conditions maintained as before. However, after eight months' operation the regular analysis of the effluents showed that the decomposition losses had not at that time exceeded 1%. Hence, it is apparent that the life of the new catalyst is much longer than that of the older type.

*Example III*

In accordance with this example, a comparison was made of the decomposition losses over a period of approximately six months on a battery of catalyst units which had been changed over to the improved catalyst screens in accordance with the present invention, with the prior six months' operation of the same units when containing the old type catalyst. In other words, all other conditions were substantially the same. This comparison showed that over 170,000 pounds of the ethyl alcohol feed was saved because the decomposition losses were that much lower. In addition the actual record of the maintenance cost of these same units was several thousand dollars lower.

*Example IV*

In accordance with this example a catalyst unit containing the old type copper-silver, unprocessed screen was shut down after eight months' operation, inasmuch as the decomposition products in the effluents were greater than 3%. The unit was disassembled and the catalyst screens subjected to five hours treatment at 900° F. in a furnace, in accordance with the present invention as described above. The catalyst screens thus treated were reassembled, compressed and the unit started up in accordance with Example I. After eight months' of continuous use the unit was still in operation and the analysis of the effluents showed that the decomposition products had not exceeded 2%, although the conversion per pass of alcohol to aldehyde consistently averaged greater than 35%.

At the end of eight months the unit was again shut down, the catalyst screens removed, again treated as above described, and the unit reassembled and placed in operation. The decomposition losses at the end of two months' operation were below 1%, thereby showing that the catalyst may be repeatedly treated by the procedure of the present invention.

While in the foregoing examples, for convenience of illustration, our invention has been described by reference to the conversion of ethyl alcohol to acetaldehyde, in a similar manner propyl alcohol, butyl alcohol and other organic hydroxy compounds may be converted to their corresponding carbonyl compounds.

It will also be kept in mind that the present type catalyst may be employed in the converting of secondary alcohols to ketones such as the conversion of isopropanal to acetone and in many other similar conversions.

*Example V*

In accordance with this example the conversion of isopropanol to acetone was carried out. A general apparatus arrangement for processing 3–4 carbon atom alcohols is described in companion Hasche Patent 2,173,111. Hence, extended description of general process and equipment details herein is unnecessary. It is sufficient for the purposes of the present invention to point out that screen catalysts as above described in the preceding examples were contained in a catalyst unit. Isopropanol and air were fed to the lower side of the screen and in passing therethrough became converted to acetone. After operating the unit for a period the decomposition products in the effluent gases amounted to over 1.1%, thereby indicating that losses were being encountered due to the isopropanol being decomposed into carbon monoxide and hydrogen. The unit was stopped and the catalyst screens removed and subjected to a heating at 1000° F. for two and one-half hours. This heating was in a furnace as already described in detail above. After the heating the screens were subjected to an air blast as already described for dislodging from the screens any attached particles. The catalyst screens thus treated were reassembled with compression into the same catalyst unit and the process reinstituted (after the screens were brought to temperature, above 585° F. by the use of hot combustion products) by supplying isopropanol and air. Analysis of effluents showed that the decomposition products had dropped to 0.7% and that the liberated hydrogen from the conversion of isopropanol to acetone had increased from about 14.2% to 16.6%. This indicated an increase in conversion of at least 3.7%. The unit with this increase in conversion operated continuously for ten months in the production of acetone from isopropanol before the decomposition products again exceeded 1.1%.

*Example VI*

In accordance with this example a converter corresponding to the converter of Example V and containing a similar screen catalyst was employed for the conversion of secondary butanol to methyl ethyl ketone. Approximately 67 units by weight of the secondary butanol were fed to the unit per 24-hour period. The unit was operated at a temperature between 824° F. and 932° F. Analysis of the effluent gases indicated that the loss was approximately 3% due to carbon monoxide and carbon dioxide formation. After removing and treating the catalyst screens at approximately 1000° F. for 5 hours in the furnace described earlier, the screens were reassembled in the catalyst unit. Thereafter the catalyst unit was brought to temperature by means of introduction of combustion gases and then a feed of secondary butanol and air (about 5% axcess air) was supplied thereto for producing methyl ethyl ketone. The loss due to the formation of decomposition products was then less than 1% and the unit was operated for more than six months before the loss again exceeded 1%.

In a similar manner normal propyl alcohol was passed in contact with annealed screen catalyst of the present invention to give continuous production of a normal propylaldehyde. Likewise, normal butanol was processed in contact with the annealed-compressed catalyst screens of the present invention to give continuous high yields of normal butyraldehyde over extended periods of operation. The exact temperature at which the alcohols may be contacted with the annealed-catalyst screen may vary from 400° F. to 1200° F. and is not to be considered a limitation on the present invention. In other words, after the catalyst screen has been brought to temperature sufficient to cause reaction (by means of some ancillary heating, such as the introduction of combustion gases) alcohol and air are fed against the catalyst screen and the process is sufficiently exothermic to maintain the reaction. The temperature of the ancillary heating may vary from 432° F. to 662° F.

While in the first portion of this specification we have described our invention primarily as carried out using a catalyst made up of both copper and silver members and prefer to use such a combination catalyst for economic and other reasons, the principles of the present invention may be applied where the catalyst is comprised of each copper and silver. That is, we have found, respecting catalysts comprised principally or solely of copper or catalysts comprised principally or solely of silver and when utilized for the conversion of lower aliphatic alcohols to the corresponding carbonyl derivatives, if such catalysts have been treated in accordance with the present invention, that improved results may likewise be obtained. Further teachings respecting such catalytic processes employing catalysts of either copper or silver may be had from a consideration of the following examples:

*Example VII*

In accordance with this example, a comparison was made of a catalyst unit operating on the conversion of ethyl alcohol to acetaldehyde, which catalyst unit contained only copper catalyst screens. These copper screens had not been treated in accordance with the present invention. However the other conditions of operation were substantially the same as already described. It was found not readily possible to operate such units with any degree of satisfaction when copper screens of the untreated type were used. That is, the temperatures were difficult to control and the decomposition was high as indicated by carbon dioxide and carbon monoxide in excess of 6% in the effluent gas stream.

Upon replacing the aforementioned untreated copper screens with catalyst screens which had been heat treated at temperatures in excess of 500° F. for 3 to 15 hours, it was found that the temperature of operation for converting alcohols to carbonyl compounds was relatively easily controlled. The carbon dioxide and carbon monoxide present in the effluent gas stream was less than 3% even after three days of operation. Specifically in this example, the conversion of ethyl alcohol to acetaldehyde was approximately 27% with decomposition losses below 3%. This indicated considerably lower decomposition than in the first instances where untreated copper screens were used.

*Example VIII*

In accordance with this example a comparison between a unit packed with all-silver untreated catalyst screens was made with the functioning of a unit packed with all-silver catalyst screens which had been treated in accordance with this invention. That is, in the operation of the preferred unit the all-silver catalyst screens had been subjected to heating for several hours at a temperature in excess of 500° F., as already described in detail above, prior to assembling and compressing the screens in the catalyst unit. The feed of alcohol to the units, the temperature of operation of the units, and the like details, were substantially the same in both instances.

The unit packed with the all-silver untreated screens operated for a period of approximately three months. The decomposition products of carbon dioxide and carbon monoxide averaged about 0.8% at the start and 3.9% at the finish.

In comparison therewith, the unit packed with the all-silver screens treated in accordance with the present invention operated for a period of seven months. The decomposition products of carbon dioxide and carbon monoxide averaged 0.5% at the start and 0.7% at the finish.

It is thus apparent that the procedures of this invention improve the life of units packed with either all-copper or all-silver screens and decrease the formation of decomposition products when passing alcohols over such catalysts as compared with operations wherein the catalyst screens are used as obtained and in an untreated condition.

While it is not desired to be bound by any theory of operation, the following may be an explanation of the phenomena involved and may aid in a better understanding of the invention: It is apparent that, since the processes in which the improvement of the present invention takes place are processes wherein large amounts of air have been continually fed, the present treatment goes beyond the mere oxidation of organic matter on the catalyst by hot air as described in the aforementioned publications. Previous methods of cleaning the catalyst screens have also included mechanically abrading the screen surfaces until they were visibly shiny and clean. However, such prior methods of removal of carbon and the like from the screens did not give the used screens restored activity. Hence, it may be that the treatment described herein functions to release iron oxide occluded with carbon particles, particularly in the pores of the screen metal, as evidenced by the aforementioned analysis of the materials dusted off the screens by means of a compressed air hose. It may also be that the relatively uniform heating under the conditions described herein releases certain internal strains in the catalyst screens thereby lengthening and making more uniform the catalytic activity of the screens.

However, by whatever the action, we have found a method of treating catalyst materials which readily lends itself to commercial adoption with good results, even with unskilled operators. While the treatment of screens has been described, as this is a common commercial type material, other physical forms of material such as netting, open mesh work, rods, pellets, and the like may be treated in a similar manner, and with equally satisfactory results.

We claim:

1. The process which comprises passing a lower aliphatic alcohol of at least 2 carbon atoms and air into contact with a catalyst comprised of alternate layers of pre-annealed copper and silver screens sufficiently open to permit the ready passage of vapors of alcohol therethrough, said screens being compressed 2-6% of their uncompressed height, the preannealing including heating the catalyst for several hours in an oxidizing atmosphere at a temperature above 500° F.

2. The process which comprises passing a lower aliphatic alcohol of at least 2 carbon atoms and air into contact with a catalyst comprised of alternate layers of preannealed copper and silver screens sufficiently open to permit the ready passage of vapors of alcohol therethrough but being compressed 2-6% of its uncompressed height, not more than 6 layers of the silver and copper screens being adjacent to one another, the preannealing including heating the catalyst for several hours in an oxidizing atmosphere at a temperature above 500° F.

3. The process which comprises passing a vaporous mixture of air and a lower aliphatic alcohol from the group consisting of ethanol, propanol, and butanol through a catalyst comprised of alternate layers of preannealed copper and silver screens sufficiently open to permit the ready passage of the vapors of alcohol and air therethrough but compressed 2-6% of its uncompressed height, the preannealing including heating the catalyst for several hours in an oxidizing atmosphere at a temperature above 500° F.

4. The process for converting lower aliphatic alcohols of at least two carbon atoms to their corresponding carbonyl derivatives in a rapid, uniform manner with high conversion which comprises contacting said alcohol in the presence of a gaseous oxidizing medium and at a temperature between 400° F. to 1000° F. with screen catalyst essentially comprised of at least one metal from the group consisting of copper and silver, said catalyst being characterized in that it has prior to use been processed in an oxidizing atmosphere for between three to fifteen hours at a temperature between 500° F. to 1500° F. whereby decomposition losses of the alcohol fed or the carbonyl compound produced to carbon monoxide or carbon dioxide are less than 3%.

5. The process for converting ethyl alcohol to acetaldehyde in a rapid, uniform manner with high conversion which comprises contacting said alcohol in the presence of excess gaseous oxidizing medium and at a temperature above 400° F. with a screen catalyst essentially comprised of a metal from the group consisting of copper and silver, said catalyst being characterized in that it has prior to use been processed in an oxidizing atmosphere for between three to fifteen hours at a temperature between 500° F. to 1500° F. and thereafter compressed.

6. In a process which comprises passing a lower aliphatic alcohol of at least 2 carbon atoms and air through a screen catalyst, said screen being at a sufficiently high temperature to cause the conversion of the alcohol to a carbonyl compound and passing the alcohol through the screen until the effluent gases show greater than 3% carbon monoxide and carbon dioxide, the improvement steps which comprise discontinuing the passage of alcohol and air through the catalyst screen essentially comprised of a metal from the group consisting of copper and silver and subjecting the catalyst screen to an annealing treatment for several hours at a temperature between 500° F. and 1500° F., in an atmosphere obtained by burning hydrocarbon fuel in the presence of excess air, thereafter returning the annealed catalyst screen to the process and passing alcohol and air in contact therewith, whereby losses due to carbon monoxide and carbon dioxide formation are reduced to substantially below 3%.

7. In a process which comprises passing ethanol and air through a screen catalyst, said screen being at a sufficiently high temperature to cause the conversion of the ethanol to acetaldehyde and passing the ethanol and air through the screen until the effluent gases show greater than 3% carbon monoxide and carbon dioxide, the improvement steps which comprise discontinuing the passage of ethanol and air through the screen catalyst essentially comprised of a metal from the group consisting of copper and silver and subjecting the catalyst screen to an annealing treatment for three to fifteen hours, at a temperature between 500° F. and 1500° F., in an atmosphere obtained by burning hydrocarbon fuel in the presence of excess air, thereafter returning the annealed catalyst screen to the process and passing ethanol and air in contact therewith, whereby losses due to carbon monoxide and carbon dioxide formation are reduced to substantially below 3%.

References Cited in the file of this patent

UNITED STATES PATENTS

| Number | Name | Date |
| --- | --- | --- |
| 1,067,665 | Kuznezow | July 15, 1913 |
| 1,100,076 | Hochstetter | June 16, 1914 |
| 1,400,204 | Backhaus | Dec. 13, 1921 |
| 2,307,934 | Loder et al. | Jan. 12, 1943 |
| 2,384,066 | Balcar | Sept. 4, 1945 |

OTHER REFERENCES

Ellis, "The Chemistry of Petroleum Derivatives," vol. II, pages 878-880 (1937), Reinhold Publishing Corp., New York.